(12) United States Patent
Bichler et al.

(10) Patent No.: US 11,604,948 B2
(45) Date of Patent: Mar. 14, 2023

(54) STATE-AWARE CASCADED MACHINE LEARNING SYSTEM AND METHOD

(71) Applicant: Robert Bosch GmbH, Stuttgart (DE)

(72) Inventors: Rudolf Bichler, Eningen (DE);
Thomas Rocznik, Mountain View, CA (US); Kejia Wang, Stuttgart (DE);
Christian Peters, Mountain View, CA (US)

(73) Assignee: Robert Bosch GmbH, Stuttgart (DE)

(*) Notice: Subject to any disclaimer, the term of this patent is extended or adjusted under 35 U.S.C. 154(b) by 357 days.

(21) Appl. No.: 16/833,111

(22) Filed: Mar. 27, 2020

(65) Prior Publication Data
US 2021/0303936 A1    Sep. 30, 2021

(51) Int. Cl.
| | | |
|---|---|---|
| G06K 9/62 | (2022.01) |
| G06N 20/20 | (2019.01) |
| G06N 3/049 | (2023.01) |

(52) U.S. Cl.
CPC ......... G06K 9/6269 (2013.01); G06K 9/6256 (2013.01); G06K 9/6293 (2013.01); G06N 3/049 (2013.01); G06N 20/20 (2019.01)

(58) Field of Classification Search
CPC .......... G06N 20/00; G06N 20/20; G06N 3/08; G06N 3/049; G06K 9/6269; G06K 9/6293
See application file for complete search history.

(56) References Cited

U.S. PATENT DOCUMENTS

| | | | | |
|---|---|---|---|---|
| 9,356,941 B1 * | 5/2016 | Kislyuk | ................ | H04L 63/14 |
| 10,242,323 B2 * | 3/2019 | Battersby | .............. | G06N 20/10 |
| 2007/0112701 A1 * | 5/2007 | Chellapilla | ............ | G06N 20/00 |
| | | | | 706/15 |
| 2009/0252435 A1 * | 10/2009 | Wen | ...................... | G06V 40/161 |
| | | | | 382/284 |
| 2012/0141017 A1 * | 6/2012 | Krupka | .............. | G06V 10/7747 |
| | | | | 382/190 |
| 2015/0121108 A1 * | 4/2015 | Agrawal | ................. | G06F 21/35 |
| | | | | 713/323 |

(Continued)

FOREIGN PATENT DOCUMENTS

CA       3098172 A1 * 10/2019   ......... G06K 9/00255

OTHER PUBLICATIONS

Daniel Godoy, "Understanding binary cross-entropy / log loss: a visual explanation", Website: https://towardsdatascience.com/understanding-binary-cross-entropy-log-loss-a-visual-explanation-a3ac6025181a.

*Primary Examiner* — Shaghayegh Azima
(74) *Attorney, Agent, or Firm* — Brooks Kushman P.C.

(57) ABSTRACT

A cascaded machine learning inference system and method is disclosed. The cascaded system and method may be designed to be employed in resource restricted environments. The cascaded system and method may be applicable for applications that operate with limited power (e.g., a wearable smart watch). The cascaded system and method may employ two or more subsystems that are operable to classify an input signal provided by any number or types of sensors suitable for a given application. For instance, the sensors used may include gyroscopes, accelerometers, magnetometers, or barometric altimeters. The system and method may also be further split functionality across additional or new subsystems. By splitting operations and functionality across additional subsystems, the overall power consumption may further be reduced.

20 Claims, 4 Drawing Sheets

(56) References Cited

U.S. PATENT DOCUMENTS

| | | | |
|---|---|---|---|
| 2019/0279040 A1* | 9/2019 | Park | G06N 20/00 |
| 2020/0204684 A1* | 6/2020 | Hashimoto | G10L 25/51 |
| 2020/0250766 A1* | 8/2020 | Sancheti | G06Q 30/01 |
| 2020/0265238 A1* | 8/2020 | Polavarapu | G06N 20/00 |
| 2020/0271756 A1* | 8/2020 | Novoselsky | G01S 7/415 |
| 2021/0042542 A1* | 2/2021 | Littman | G06V 10/764 |
| 2021/0303936 A1* | 9/2021 | Bichler | G06N 3/0454 |
| 2021/0386343 A1* | 12/2021 | Goldenberg | A61B 5/1032 |

* cited by examiner

STATE-AWARE CASCADED MACHINE LEARNING SYSTEM AND METHOD

TECHNICAL FIELD

The present disclosure relates to a machine-learning system that includes two or more subsystems operable to classify an input signal that may be provided by an inertial sensor.

BACKGROUND

The task of classifying input data using machine-learning algorithms is understood as being applicable across differing applications. Based on a given application, a single machine-learning algorithm may be extremely large with several tens of millions of variables. Such a large network typically requires significant computational processing power and large data storage resources. Consequently, such machine-learning models may have a large energy footprint. Typically, such large machine-learning models aren't deployable in resource constrained settings such as wearable devices, smart phones, or IoT devices.

SUMMARY

A cascaded machine-learning system and method is disclosed. The system and method may comprise a first subsystem that includes a plurality of operating states and at least a first machine-learning algorithm and a second subsystem that includes a second machine-learning algorithm. The second subsystem may be activated when a first set of sensed data signals is received. The second algorithm (i.e., second machine learning algorithm) may classify the first set of sensed data signals. A first operating state may be selected from the plurality of operating states to be employed by the first subsystem. A set of activity parameters to be used by the first subsystem may also be selected based on the first operating state. The second subsystem may be de-activated (e.g., to conserve power), and the first algorithm (i.e., first machine-learning algorithm) may classify a second set of sensed data signals. A classification of the second set of sensed data signals may then be compared with the set of activity parameters. And, the second subsystem may be re-activated if an output classification performed using the first machine-learning algorithm is invalid.

The cascaded machine-learning system and method may also compare a confidence level of the classification of the second set of sensed data signals using the first machine-learning algorithm against a threshold. If the confidence level is less than the threshold, the second subsystem may also be re-activated. It is also contemplated that the second set of sensed data signals may be classified using the second machine-learning algorithm. If the classification of the second set of sensed data signals using the at least the first machine-learning algorithm is equal to the classification of the second set of sensed data signals using the second machine-learning algorithm, the threshold may be increased. Or, the threshold may be decreased if the classification of the second set of sensed data signals using the second machine-learning algorithm is equal to the one of the set of activity parameters. The second set of sensed data signals may be classified using the second machine-learning algorithm if the threshold is adjusted. It is further contemplated that the threshold may be temporarily or permanently stored within memory.

The second set of sensed data signals may also be classified using the second machine-learning algorithm after a predetermined period has expired. It is contemplated that the first subsystem may be employed on the first processor (e.g., a low-power micro-processor) and the second subsystem is employed on a second processor (e.g., an application processor). The second machine-learning algorithm may also be trained using a full training dataset and a plurality of labels. And, the first subsystem may be trained using a full training dataset but one or more specified labels are combined into one class.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

For machine-learning algorithms, the use of neural networks (e.g., CNN or DNN) has increased and is now employed across a wide variety of applications that include classifying input data to provide event detection, activity classification, image classification, and object classification (e.g., object recognition or facial recognition). However, conventional neural networks employed to classify input data from inertial sensors may be extremely large requiring significant computation and data storage resources. Such large networks consequently consume large amounts of energy and typically have large power footprints. Also, conventional neural networks typically can't be deployed in resource constrained settings (e.g., within wearable devices like smart watches or IoT devices).

It is therefore contemplated that a cascaded machine learning inference may be designed to be employed in resource constrained settings or environments. The cascaded system and method may be applicable for applications that operate with limited power (e.g., a wearable smart watch, smart phone, or IoT device). The cascaded system and method may employ two or more subsystems that are operable to classify an input signal provided by one or more sensors. Sensors typically used in consumer devices are MEMS-based gyroscopes, accelerometers, magnetometers, pressure sensors, or barometric altimeters. The system and method may also further split functionality across additional or new subsystems. By splitting operations and functionality across additional subsystems, the overall power consumption may further be reduced.

It is contemplated that the cascaded system may employ one subsystem (i.e., a first subsystem executing a first machine learning algorithm) that receives and classifies data according to a limited set of activities, images, classes, objects, or object groups. The classified data may then, under certain situations and depending on the application, be transmitted to a more complex subsystem (i.e., a second subsystem executing a second machine learning algorithm) that performs a full classification. By employing two subsystems with varying complexity in regards to the classification performed and area consumption, the multi-stage network may require less power than conventional machine-learning networks.

Figure 1:
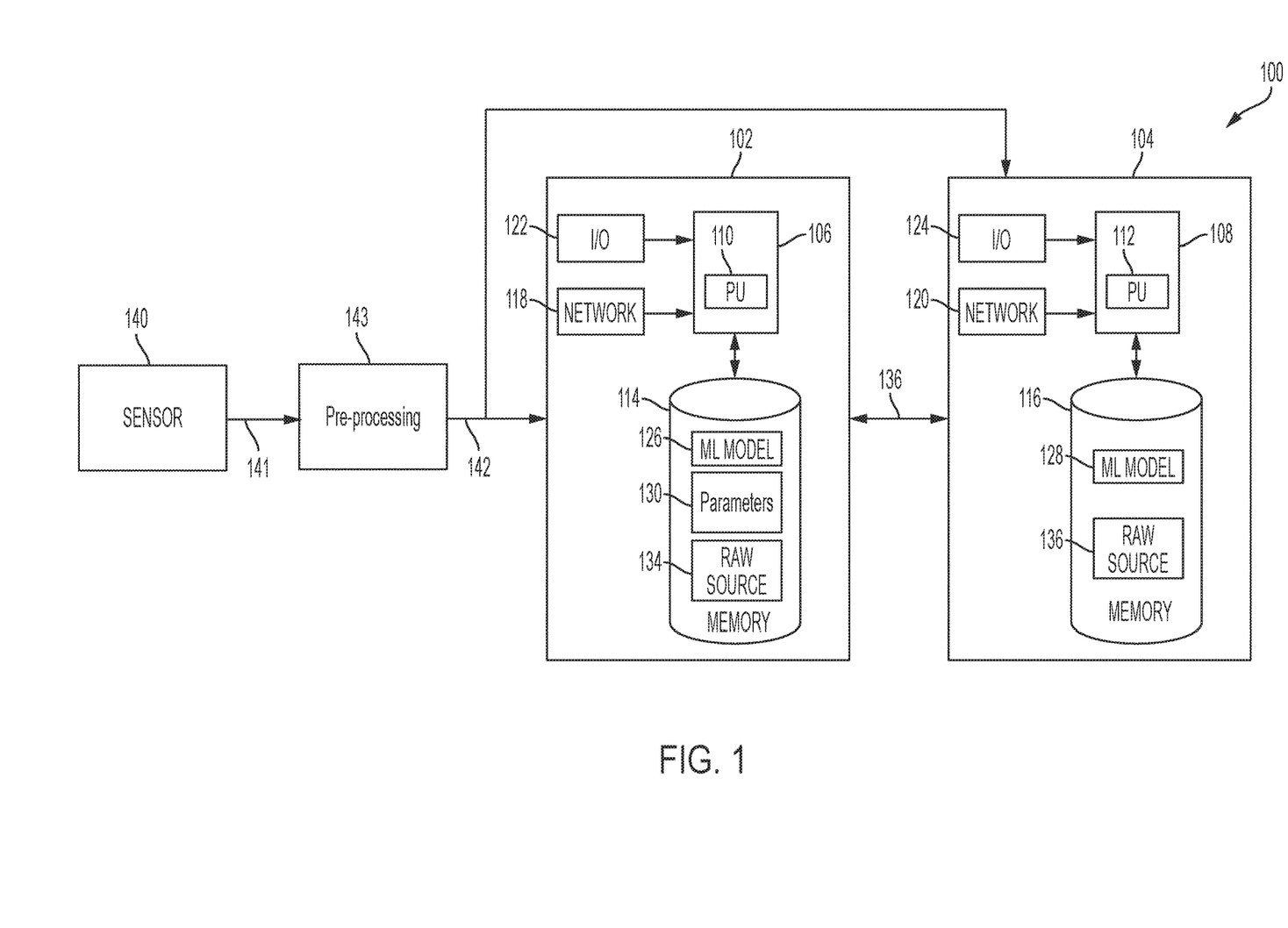
FIG. 1 illustrates an exemplary embodiment of a cascaded system having a first subsystem and a second subsystem.

FIG. 1 illustrates an exemplary embodiment for a cascaded system 100 that includes a first subsystem 102 and a second subsystem 104. As shown, the first subsystem 102 and the second subsystem 104 may be designed to include at least one processor 106, 108 operatively connected to a respective memory unit 114, 116. One or more sensors 140 may also be electrically connected to the first subsystem 102 and the second subsystem 104. The one or more sensors 140 may comprise time series sensors like gyroscopes, accelerometers, magnetometers, pressure sensors, barometric altimeters, photoplethysmogram (PPG), heart rate sensor, or piezoelectric sensor. However, these are just exemplary sensors and it is understood that the cascaded system 100 may be designed to operate with any other kind of sensor depending on the application. The one or more sensors 140 may provide signal data 142 to the first subsystem 102 and a second subsystem 104.

Each processor 106, 108 may be one or more integrated circuits that implement the functionality of a respective processing unit (PU) 110, 112. The PU 110, 112 may be a commercially available processing unit that implements an instruction set such as one of the x86, ARM, Power, or MIPS instruction set families. However, it is contemplated that commercially available processing units may be an exemplary method for implementing the first subsystem 102 and the second subsystem 104. For instance, it is also contemplated that PU 110, 112 may be a specialized accelerator unit that includes special functions or instructions which are optimized for implementing a machine learning algorithm or neural network (e.g., a CNN, DNN or decision trees) such as an analog computational unit or a unit that performs computational operations in memory. It is further contemplated that the PU 110, 112 may be designed using a specialized integrated circuit such as an application-specific integrated circuit (ASIC) or a field programmable gate array (FPGA).

During operation, each PU 110, 112 may execute stored program instructions that are retrieved from the associated memory units 114, 116. The stored program instructions may include software that controls operation of each PU 110, 112 to perform the operation described herein. In some examples, each processor 106, 108 may be a system on a chip (SoC) that integrates functionality of each PU 110, 112; each memory unit 114, 116; an associated network interface 118, 120; and an associated input/output interface 122, 124. It is contemplated that the first subsystem 102 and the second subsystem 104 may implement an operating system for managing various aspects of the operation.

Each memory unit 114, 116 may include volatile memory and non-volatile memory for storing instructions, data and parameters. The non-volatile memory may include solid-state memories, such as NAND flash memory, magnetic and optical storage media, or any other suitable data storage device that retains data when the first subsystem 102 and the second subsystem 104 is deactivated or loses electrical power. The volatile memory may include static and dynamic random-access memory (RAM) that stores program instructions and data. For example, each memory unit 114, 116 may store a machine-learning model 126, 128 or algorithm. The memory unit 114, 116 may also store parameters or data (e.g., coefficients, weights) that may then be loaded by the PU 110, 112 for use by the machine-learning model 126, 128. In particular, the first subsystem 102 may store parameters 130 that may be used by the machine-learning model 126 for classifying a given activity, image, class, object, or object group.

It is contemplated that the first subsystem 102 and second subsystem 104 may also pre-process the data 142 received from the sensor 140 using a pre-processing circuit or algorithm 143. Pre-processing of the data 142 may include implementing known smoothing, filtering, averaging techniques to remove potential noise. After being pre-processed, the data 142 may then be stored as source data 134, 136 within memory unit 114, 116. Or, it is also contemplated that the pre-processing of the data 142 may occur external to the first subsystem 102 and second subsystem 104. As such, raw data 141 may be provided directly for use to the first subsystem 102 and the second subsystem 104. Even if the pre-processing occurs externally, the data 142 may still be stored as source data 134, 136 within memory unit 114, 116. Or the pre-processed data 142 may be provided directly for use by the PU 110, 112.

Again, the first subsystem 102 and the second subsystem 104 may also include an associated network interface device 118, 120. It is contemplated that the network interface device 118, 120 may be configured to provide a communication link 138 between the first subsystem 102 and the second subsystem 104. Alternatively, the network interface device 118, 120 may be configured to communicate with additional external systems and devices (e.g., sensors). The network interface device 118, 120 may communicate using $I^2C$, SPI, similar methods that allow for communication between microcontrollers, EEPROMs, A/D and D/A converters, I/O interfaces and other similar peripherals in embedded systems. Additionally, the network interface device 118, 120 may be configured to include a wired and/or wireless Ethernet interface as defined by Institute of Electrical and Electronics Engineers (IEEE) 802.11 family of standards. The network interface device 118, 120 may include a cellular communication interface for communicating with a cellular network (e.g., 3G, 4G, 5G).

The first subsystem 102 and the second subsystem 104 may also be operable to communicate with an external network (e.g., the world-wide web or Internet). The external network may be designed to establish a standard communication protocol between computing devices. The external network may allow information and data to be easily exchanged between the first subsystem 102, the second subsystem 104, and external networks. For instance, one or more servers may be connected and in communication with the first subsystem 102 and the second subsystem 104 using the external network.

The first subsystem 102 and the second subsystem 104 may implement the associated machine-learning algorithms 126, 128 that are configured to analyze the data 134, 136 that may include unprocessed data 141 or pre-processed data 142 received from sensor 140 (e.g., an inertial sensor). Or, the first subsystem 102 and the second subsystem 104 may implement the associated machine-learning algorithms 126, 128 to directly analyze the unprocessed data 141 or pre-processed data 142 received from sensor 140. The data 134, 136 (or unprocessed data 141 and pre-processed data 142) may be video, video segments, images, and raw or partially processed sensor data (e.g., data from digital camera or LiDAR sensor). In some examples, the machine-learning algorithms 126, 128 may be a machine-learning algorithm (e.g., CNN or DNN) that may be designed to perform a predetermined function.

However, it is further contemplated that the first subsystem 102 and the second subsystem 104 may be designed to implement non-machine learning algorithms depending on the application. For instance, rather than a machine-learning algorithm, the first subsystem 102 and the second subsystem 104 may implement an algorithm that evaluates a gravity vector. The algorithm may then be operable to infer decisions based on the noise of the vector (e.g., is a mobile device in motion) and an orientation of the vector for the mobile device. The algorithm may use the orientation of the vector to determine whether the mobile device is positioned face up or face down upon a surface.

While the cascaded system 100 is illustrated with the first subsystem 102 and the second subsystem 104 being executed on separate devices, it is contemplated that both subsystems may be implemented on a single device. For instance, PU 110 may be operable to load and execute both machine learning model 126 (i.e., the machine learning algorithm employed by the first subsystem 102) and machine learning model 128 (i.e., the machine learning algorithm employed by the second subsystem 104). And, the PU 110 would be operable to load and execute additional machine learning algorithms.

It is contemplated that the first subsystem 102 and second subsystem 104 could also be executed simultaneously on the PU 110 regardless of whether designed using a commercially available processor (e.g., x86) or a specialized processor (e.g., ASIC). For instance, if PU 110 is designed using a specialized integrated circuit (e.g., ASIC), a portion of the logic may be designed to implement the machine learning model 126 employed by the first subsystem 102 and a separate portion of logic may be designed to implement the machine learning model 128 employed by the second subsystem 104.

Or if PU 110 is designed using a commercially available processor, machine learning models 126, 128 may both be loaded. In either scenario, when the first subsystem 102 is active a portion of the PU 110 associated with the second subsystem 104 may be deactivated or placed into a low-power sleep mode to conserve power. When the second subsystem 104 is needed, the PU 110 associated with machine learning model 128 may be activated and the machine learning model 126 employed by the first subsystem 102 may be deactivated or placed into a low-power sleep mode. By toggling or deactivating portions of the PU 110 between operating the first subsystem 102 and the second subsystem 104, the overall power consumption of the cascaded system 100 can be reduced.

Again, the first subsystem 102 and the second subsystem 104 may be designed to operate using machine learning models 126, 128. It is contemplated that the machine learning models 126, 128 may be implemented using a convolutional neural network (CNN), Deep Neural Networks (DNNs), Recurrent Neural Network (RNN), Long Short-Term Memory (LSTM), or decision trees. However, it is contemplated that the machine-learning model may include other known algorithms for classification of data received from a sensor.

Figure 2:
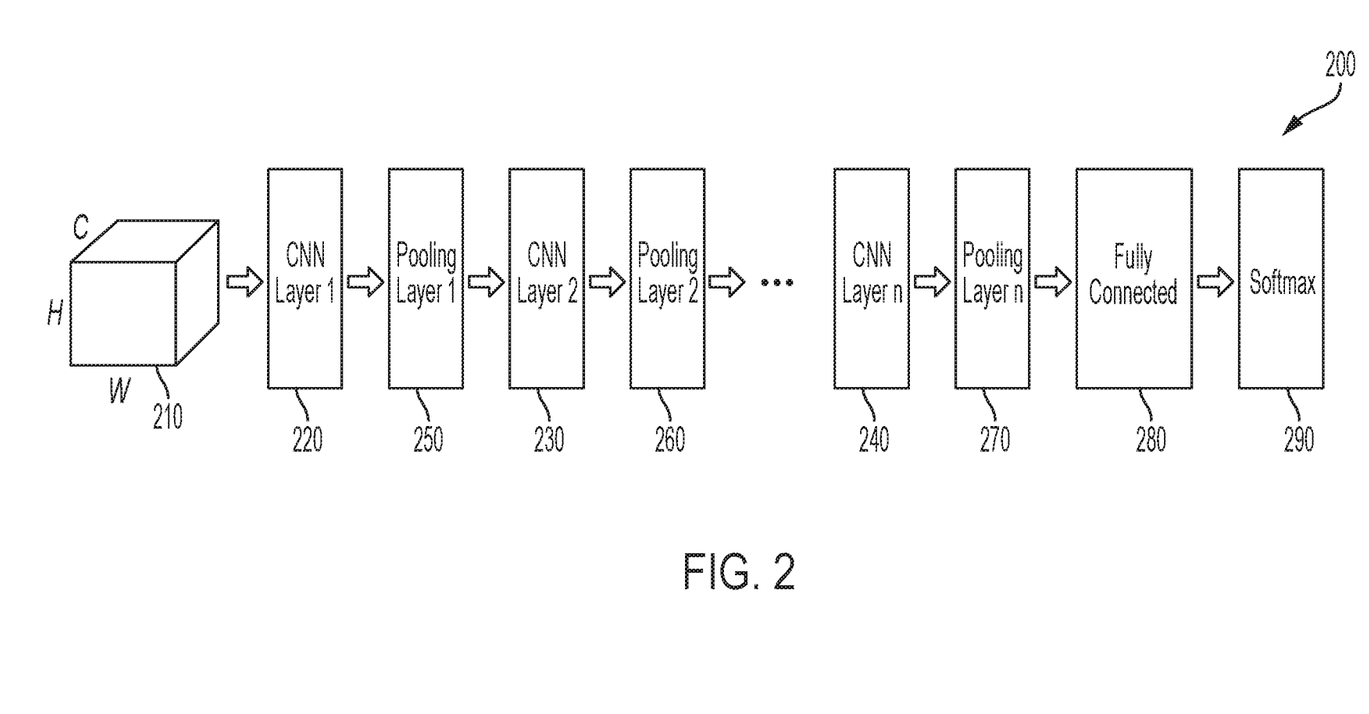
FIG. 2 illustrates an exemplary CNN that may be employed by the first subsystem or the second subsystem.

For instance, FIG. 2 illustrates an exemplary CNN 200 that may be used to implement the first subsystem 102 or the second subsystem 104 to provide a partial, specific, or full classifications of the provided data or input signal. As illustrated, CNN 200 may include one or more convolutional layers 220-240; one or more pooling layers 250-270; one or more fully connected layer 260; and a softmax layer 270.

CNN 200 may receive data 210 (e.g., data 134, 136 or data 142 illustrated in FIG. 1) that may include image data, voice data, text data or measurements received from sensors or transducers. Again, the data 210 may also be lightly processed prior to being provided to CNN 200. Convolutional layers 220-240 may be designed to extract features from data 210. For instance, convolutional layer 220-240 may employ filtering operations (e.g., kernels) before passing on the result to the next layer of the CNN 200. The filtering operations may include image identification, edge detection of an image, and image sharpening that are applied when the data 210 received is an image. Or, the filtering operations may include time series feature extraction like mean, standard deviation, peak detection, or slope detection that are applied when the data 210 received is an image.

The CNN 200 may also include one or more pooling layers 250-270 that receives the convoluted data from the respective convolution layer 220-240. Pooling layers 250-270 may include one or more pooling layer units that apply a pooling function to one or more convolution layer outputs computed at different bands using a pooling function. For instance, pooling layer 250 may apply a pooling function to the kernel output received from convolutional layer 220. The pooling function implemented by pooling layers 250-270 may be an average or a maximum function or any other function that aggregates multiple values into a single value.

Next, one or more fully connected layers 280 may attempt to learn non-linear combinations for the high-level features in the output data received from the convolutional layers 220-240 and pooling layers 250-270. Lastly, CNN 200 may include a softmax layer 290 that combines the outputs of the fully connected layer 280 using softmax functions. It is also contemplated that the CNN 200 may further employ a batch normal layer, a max pooling layer, and a dropout layer.

Figure 3:
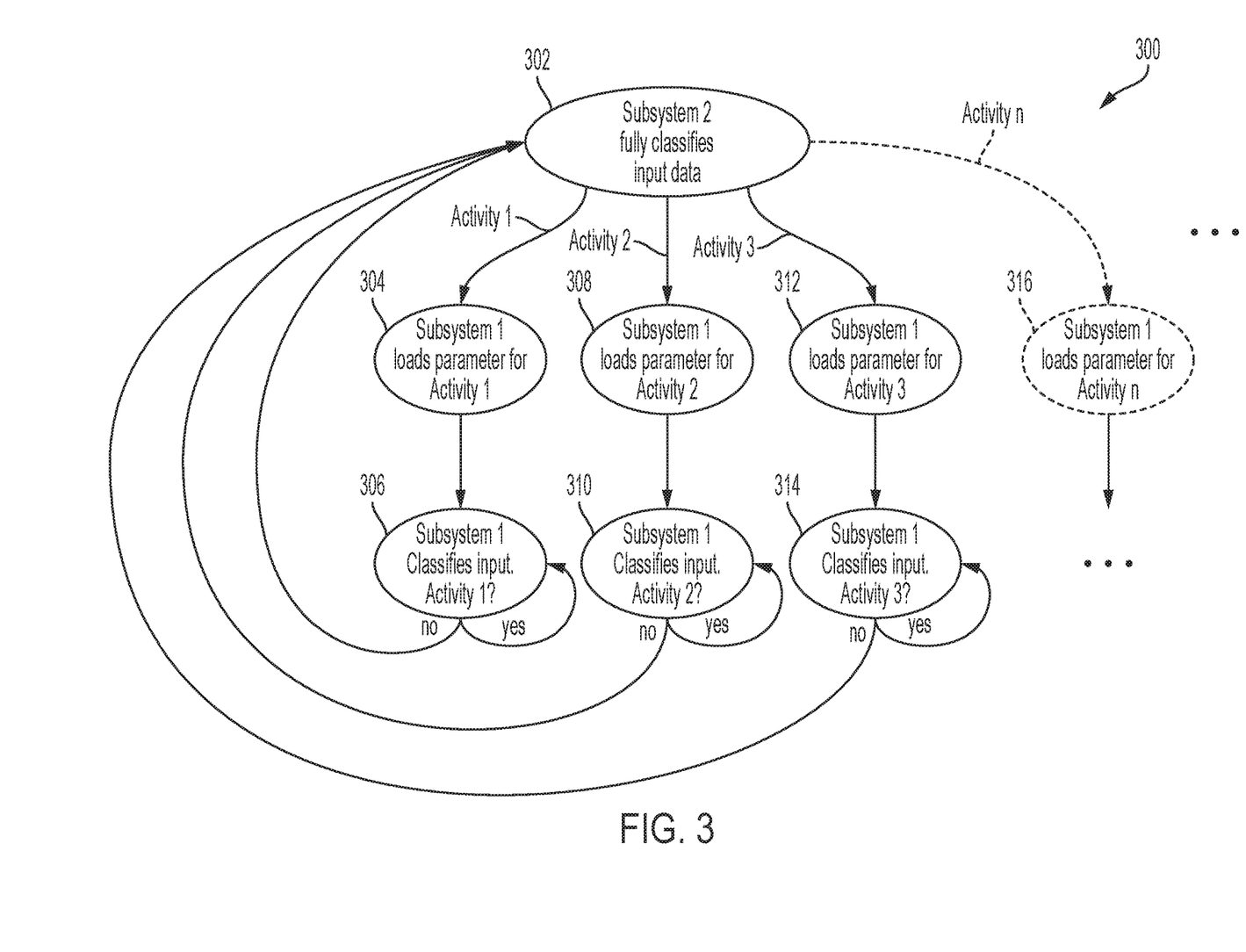
FIG. 3 illustrates an exemplary state diagram implemented by the cascaded system.

FIG. 3 illustrates an exemplary state diagram 300 that may be employed by the cascaded system 100. At state 302, the second subsystem 104 may provide a classification of the source data 134, 136. Based on the classification performed by the second subsystem 104, the state diagram 300 may proceed to one or more states 304, 308, 312, or 316 where the first subsystem 102 may run one or more various algorithms, like machine learning model. It is contemplated that each algorithm executed by the first subsystem 102 may be designed to provide a resulting classification or a not-able-to-classify result.

For instance, the cascaded system 100 may be implemented for use within or associated with wearable devices, IoT devices, edge devices, or mobile devices (e.g., smart phone) to provide a given classification—i.e., classify user activity. Based on the source data 136 (i.e., unprocessed data 141 or pre-processed data 142 provided by the sensor 140) the second subsystem 104 may determine that the user is in motion (i.e., user activity). More particularly, the second subsystem 104 may determine the source data 136 indicates the user's activity is "running." The second subsystem 104 may then trigger activation of the first subsystem 102 which may have been deactivated or in a sleep-mode to conserve power. Once activated, the state diagram 300 may proceed to state 304 where the first subsystem 302 loads parameters 130 associated with the user's activity.

The parameters 130 loaded may include user activity associated with "running" like "sprinting," or "jogging." Or the parameters 130 may include a user activity transition from "running" such as "walking." The parameters 130 loaded may also include a default "other" classification for instances where the first subsystem 102 is unable to classify the user activity (e.g., user has stopped running and is now standing still).

The state machine 300 then proceeds to state 306 where the parameters 130 are used by the machine-learning model 126 of the first subsystem 102 to determine if future data 134 (i.e., input 142 received from sensor 140) are still related to the user activity previously determined by the second subsystem 104. If yes, state machine remains at state 306 to evaluate and classify the new source data 134 (i.e., un-processed data 141 or processed data 142) acquired from sensor 140. In the current example, the first subsystem 102 may still determine the next data 134 (i.e., un-processed data 141 or processed data 142) still indicates the user activity is "running." Because the user activity is still classified as "running," the first subsystem 102 will keep the current set of parameters and the state diagram 300 remains at state 306. Again, the classification of the new source data 134 (i.e., un-processed data 141 or processed data 142) by the first subsystem 102 may consume less power than having the classification performed by the more complex machine learning model 128 of the second subsystem 104.

If state 306 determines the user activity has changed (e.g., user activity has changed from "running" to "walking") or the first subsystem 102 is unable to classify the user activity (i.e., user activity is "other"), the second subsystem 104 may be re-activated (e.g., using a trigger signal) and the state diagram 300 returns to state 302. Once the state machine 300 returns to state 302, the second subsystem 104 will again process and provide a full classification of the data 136 (i.e., input 142 received from sensor 140). Based on the full classification, state diagram 300 may then proceed to one of the states 304, 308, 312, or 316.

For instance, like the first subsystem 102 the second subsystem 104 operating at state 302 may also classify the user activity as "walking." State diagram 300 may then proceed to state 308 (i.e., activity 2) where the first subsystem 102 loads parameters 130 that will enable classifications associated with "walking." The parameters 130 may include "walking," "standing," "running," or "other." Again, the parameters loaded for the "activity 2" may include transitional user activities (i.e., "walking" or "running") or a classification indicating the first subsystem 102 is unable to detect the user activity (i.e., "other").

It is contemplated that if the first subsystem 102 does classify the user activity as "other," the second subsystem 104 may perform a full classification to determine the current state. The second subsystem 104 may then proceed to the correct state (e.g., state 304, 308, 312, 316) where the appropriate parameters are loaded for use by the first subsystem 102.

It is also contemplated that the confidence level of the classification performed by the first subsystem 102 may need to be assessed to determine if the loaded parameter set (e.g., "walking," "standing," "running," or "other") is still applicable. Cascaded system 100 may check the confidence level by defining a threshold. For instance, PU 110 may be programmed (or instructions may be loaded) to define the threshold. If the confidence level drops below the threshold, the cascaded system 100 may activate the second subsystem 104 so that a full classification may be performed. The threshold may be a fixed value or optimized by the cascaded system 100 over time.

For instance, the threshold might be initially set to a value of 50%. If the PU 110 determines the confidence level drops below the 50% threshold, the second subsystem 104 may be re-activated. However, if the second subsystem 104 re-classifies the user activity the same as previously classified, the threshold may be increased, e.g. up to 55% or down to 45%.%. In other words, the second subsystem 104 may have classified the user activity as "running." The, first subsystem 102 may have loaded parameters associated with "running," but classified the data 134 received from sensor 140 as associated with the user activity for "walking." Upon performing a full classification, the second subsystem 104 may determine the first subsystem 102 was incorrect and the user activity remains "running." By adjusting the threshold, the first subsystem 102 may not again classify the user activity incorrectly as being "walking." By implementing a confidence level threshold, the power consumption of the cascaded system 100 may be reduced because the system becomes personalized to the user.

It is also contemplated that the threshold may be saved (e.g., in memory 114, 116) and re-used each time the cascaded system 100, subsystem 102, or subsystem 104 is activated. Or, the threshold may be temporarily stored and may only be valid for a current activation period. A temporarily stored threshold may be implemented, for instance, when a user attempts to incorrectly apply a wearable device and too much movement is detected. Under this given situation, cascaded system 100 may be operable to modify the threshold once and return to the prior (or original) threshold during the next iteration. The cascaded system 100 may also detect and determine that a given threshold has been modified because a user is moving (i.e., walking) in a given manner. The cascaded system 100 may therefore be operable to "personalize" thresholds that are unique to a given user and permanently store personalized thresholds in memory 114 or 116. Lastly, the cascaded system 100 may be operable to monitor and change the threshold over a given number of usages (e.g., after wearing a smart watch 10 times) and to store the threshold after a given number of usages has been exceeded. It is also contemplated that the algorithm may not involve learning period. For instance, the algorithm may be used to detect a "light on" or "light off" occurrence within a light sensor. It is also contemplated that the threshold may be manually set.

It is contemplated that the threshold may also be reset back to the original predefined value (e.g., 50%). The threshold may have been modified and reset to an original value when a user running on flat road begins to ascend a hill, followed by descending a hill, then again proceeds down a flat road. In this scenario, the user activity may change between a classification of running (e.g., while on flat surface) and walking (e.g., when ascending the hill). When the user is running on the leveled pavement surface, the first subsystem 102 may provide a very clear (high confidence) classification. But as the user starts running uphill the user characteristics may change and the first subsystem 102 may have difficulty classifying the user as still running.

The change in user characteristics may cause the first subsystem 102 to lose confidence and jump back (i.e., activate) the second subsystem 104 for a more precise full classification. This may occur as the user is ascending the hill and not "running" as fast as on the flat pavement surface. So, the first subsystem 102 may erroneously think the user is no longer running but is instead walking. However, by performing a full classification the second subsystem 104 may still classify the user activity as running. After a few occurrences of this "back and forward" between the two subsystems, the threshold of first subsystem 102 may be reduced by 5% (e.g., to a 45% confidence threshold for running to ensure the user activity is classified as running). If, or when, the runner begins running on a flat pavement surface the confidence of first subsystem 102 may again increase and the threshold can be increased and/or reset. Also, if the threshold falls below a certain percentile (e.g. 30%), the second subsystem 104 may be activated to perform full classifications to validate the classification of the first subsystem 102.

It is also contemplated that the cascaded system 100 may also validate the threshold by running the second subsystem 104 to perform a full classification after a predetermined duration. For instance, the second subsystem 104 may be activated to perform a full classification after the first subsystem 102 has performed 10 or 100 user activity classifications. Or the duration may be time-based (e.g., 100 μs), and the second subsystem 104 may be activated after the time-based duration has expired. The second subsystem 104 may be re-activated after a predetermined duration to ensure the first subsystem 102 is not cycling and providing the same incorrect classification.

It is also contemplated that the first subsystem 102 may be activated by a hardware switch or software switch that detects a relevant sub-state that may be one of the states included within the state diagram 300 (e.g., state 304, 308, 312, or 316). The hardware switch or software switch may be used to detect a significant change within the device. The cascade system 100 may also include additional sub-states that include "NO_MOTION," "NO SIGNIFICANT_MOTION," and "NO_LOCATION_CHANGE." The cascade system 100 may use these additional sub-states to generate an intrinsic relation such as: NO_MOTION=>NO_SIGNIFICANT_MOTION=> NO_LOCATION_CHANGE. This intrinsic relation may include multiple cascading systems—e.g., cascade 1 may be a hardware interrupt and cascade 2 may be employed to check for "noise" on the sensor signal. It is also contemplated that the hardware and software switches may be employed to activate state specific sensors like an accelerometer to detect motion, a pressure sensor to detect height/elevation changes, or a gyroscope to detect for rotational changes.

Figure 4:
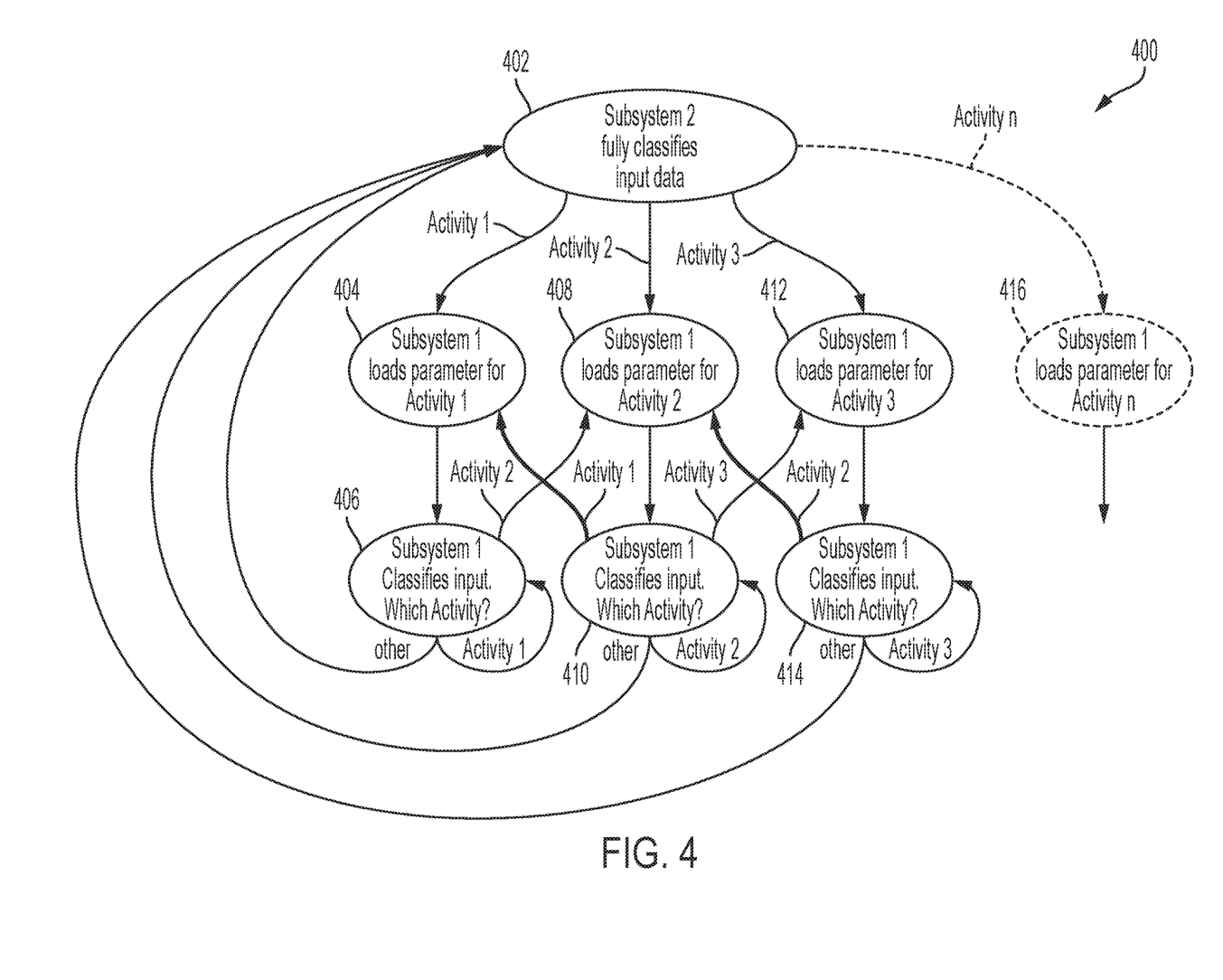
FIG. 4 illustrates another exemplary state diagram implemented by the cascaded system.

FIG. 4 illustrates another state diagram 400 according to alternative embodiment of the cascade system 100. It is contemplated that the alternative embodiment may share similar functionality and operating states as those described with reference to state diagram 300. For instance, state 402 may operates in a similar manner as state 302. Likewise, states 404, 408, 412, and 416 may operate like states 304, 308, 312, and 316 described above. State diagram 400 may vary however based on the decision making performed by the first subsystem 102 with respect to states 406, 410, and 414. More particularly, the first subsystem 102 may toggle to another classification activity without re-activating or performing a classification using the second subsystem 104.

For instance, the second subsystem 104 may have classified a user activity as "running" at state 402. The state diagram 400 may have then proceeded to state 404 where the parameters 130 associated with "running" where loaded by the first subsystem 102. At state 406, the first subsystem 102 may continue to evaluate the data 134 from the sensor 140. Unlike state diagram 300, if the first subsystem 102 classifies the user activity as being associated with the second activity (e.g., "walking"), the first subsystem 102 will toggle to state 408 where the parameters 130 associated with "walking" will be loaded. The state diagram 400 will then proceed to state 410 where the first subsystem 102 will continue to classify the data 134 received from the sensor 140. By toggling between the states associated with the first subsystem 102, the second subsystem 104 will not be continually re-activated further reducing power consumption.

It is contemplated that the first subsystem 102 may also change parameters of the signal source (e.g., a MEMS element operable to improve the key performance indicators (KPI) of the cascaded system 100). By modifying the parameters, power consumption may again be reduced due to a reduction in the sample rate. It is also contemplated that the second subsystem 104 may employ a training process that includes a full dataset and all labels. The first subsystem 102 may alternatively be trained with a full dataset but all the labels that would belong to activities classified as "others" may be combined into one class. The resulting parameter sets corresponding to each class in focus, may then be stored in associated memory 114, 116 and loaded by the first subsystem 102 and the second subsystem 104 when needed during inference.

It is contemplated that a balanced data set for the first subsystem 102 should be maintained. The balanced data set can be maintained using a weighted cross entropy of the data during the training process. It is further contemplated that the forms of partitioning of the cascaded system 100 described above are just exemplary, and each subsystem (i.e., first subsystem 102 and second subsystem 104) may also be designed to operate on highly optimized hardware (e.g., analog memory computation) or a cloud-based platform.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A cascaded machine-learning system, comprising:
    a first subsystem that includes a plurality of operating states and at least a first machine-learning algorithm;
    a second subsystem that includes a second machine-learning algorithm;
    at least a first processor operable to:
    activate the second subsystem when a first set of sensed data signals is received;
    classify the first set of sensed data signals using the second machine-learning algorithm to produce a first classification of an activity of a user of the cascaded machine-learning system;
    select a first operating state from the plurality of operating states to be employed by the first subsystem, wherein the selecting is based on the first classification;
    select a set of activity parameters to be used by the first subsystem, wherein the set of activity parameters are selected based on the first operating state;
    de-activate the second subsystem;
    classify a second set of sensed data signals using the first machine-learning algorithm to produce a second classification of an activity of the user;
    compare the second classification with the set of activity parameters; and
    re-activate the second subsystem if an output classification performed using the first machine-learning algorithm is invalid.

2. The cascaded machine-learning system of claim 1, wherein the first processor is further operable to:
    compare a confidence level of the classification of the second set of sensed data signals using the first machine-learning algorithm against a threshold; and
    re-activate the second subsystem if the confidence level is less than the threshold.

3. The cascaded machine-learning system of claim 2, wherein the first processor is further operable to:
    classify the second set of sensed data signals using the second machine-learning algorithm; and
    increase the threshold if the classification of the second set of sensed data signals using the at least the first machine-learning algorithm is equal to the classification of the second set of sensed data signals using the second machine-learning algorithm.

4. The cascaded machine-learning system of claim 2, wherein the first processor is further operable to:
    classify the second set of sensed data signals using the second machine-learning algorithm; and
    decrease the threshold if the classification of the second set of sensed data signals using the second machine-learning algorithm is equal to the one of the set of activity parameters.

5. The cascaded machine-learning system of claim 2, wherein the first processor is further operable to:
    classify the second set of sensed data signals using the second machine-learning algorithm if the threshold is adjusted.

6. The cascaded machine-learning system of claim 2, wherein the threshold is stored for a predetermined number of iterations.

7. The cascaded machine-learning system of claim 1, wherein the first processor is further operable to:
    classify the second set of sensed data signals using the second machine-learning algorithm after a predetermined period has expired.

8. The cascaded machine-learning system of claim 1, wherein the first subsystem is employed on the first processor and the second subsystem is employed on a second processor.

9. The cascaded machine-learning system of claim 8, wherein the second processor comprises an application processor and the first processor comprises a low-power micro-processor.

10. The cascaded machine-learning system of claim 1, wherein the second machine-learning algorithm is trained using a full training dataset and a plurality of labels.

11. The cascaded machine-learning system of claim 1, wherein the first subsystem is trained using a full training dataset but one or more specified labels are combined into one class.

12. A cascaded algorithm method, comprising:
    initializing a first subsystem and a second subsystem, the first subsystem including a first algorithm and a plurality of operating states, and the second subsystem including a second algorithm;
    activating the first subsystem when a first set of sensed data signals is received;
    classifying the first set of sensed data signals using the second algorithm to produce a first classification of an activity of a user of the first subsystem and the second subsystem;
    selecting at least one operating state to be employed by the first subsystem, wherein the selecting is based on the first classification;
    selecting a set of activity parameters to be used by the first subsystem, wherein the set of activity parameters are selected based on the selected operating state;
    de-activating the second subsystem;
    classifying a second set of sensed data signals using the at least the first algorithm to produce a second classification of an activity of the user;
    comparing the second classification with the set of activity parameters; and
    re-activating the second subsystem if at least one of the set of activity parameters indicates the second classification is invalid.

13. The cascaded algorithm method of claim 12 further comprising:
    comparing a confidence level of a classification of the second set of sensed data signals using the at least the first algorithm against a threshold; and
    re-activating the second subsystem if the confidence level is less than the threshold.

14. The cascaded algorithm method of claim 13 further comprising:
    classifying the second set of sensed data signals using the second algorithm; and
    increasing the threshold if the classification of the second set of sensed data signals using the second algorithm is equal to the classification of the second set of sensed data signals using the at least the first algorithm.

15. The cascaded algorithm method of claim 13 further comprising:
classifying the second set of sensed data signals using the second algorithm; and
decreasing the threshold if the classification of the second set of sensed data signals using the second algorithm is equal to one of the set of activity parameters.

16. The cascaded algorithm method of claim 13 further comprising:
classifying the second set of sensed data signals using the at least the first algorithm if the threshold is adjusted below a predetermined level.

17. The cascaded algorithm method of claim 12 further comprising:
classifying the second set of sensed data signals using the second algorithm after a predetermined period has expired.

18. A cascaded machine-learning method, comprising:
initializing a first subsystem and a second subsystem, the first subsystem including at least a first machine-learning algorithm and a plurality of operating states, and the second subsystem including a second machine-learning algorithm;
activating the first subsystem when a first set of sensed data signals is received;
classifying the first set of sensed data signals using the second machine-learning algorithm to produce a first classification of an activity of a user of the first subsystem and the second subsystem;
selecting a first operating state to be employed by the first subsystem, wherein the selecting is based on the first classification;
selecting a first set of activity parameters to be used by the first subsystem, wherein a set of activity parameters are selected based on the first operating state;
de-activating the second subsystem;
classifying a second set of sensed data signals using the at least the first machine-learning algorithm to produce a second classification of an activity of the user;
comparing the second classification with the set of activity parameters;
selecting a second operating state to be employed by the first subsystem based on the comparison; and
selecting a second set of activity parameters to be used by the first subsystem, wherein the second set of activity parameters is selected based on the second operating state.

19. The cascaded machine-learning method of claim 18 further comprising:
comparing a confidence level of a classification of the second set of sensed data signals using the at least the at least the first machine-learning algorithm against a threshold; and
re-activating the second subsystem if the confidence level is less than the threshold.

20. The cascaded machine-learning method of claim 19 further comprising:
classifying the second set of sensed data signals using the second machine-learning algorithm; and
increasing the threshold if the classification of the second set of sensed data signals using the at least the first machine-learning algorithm is equal to the classification of the second set of sensed data signals using the second machine-learning algorithm.

* * * * *